Dec. 30, 1969 W. HAHN 3,486,637
LOADING ARRANGEMENT FOR SUPERIMPOSING LAYERS OF OBJECTS
Filed Sept. 4, 1968 2 Sheets-Sheet 2

INVENTOR
Winfried Hahn
BY
Michael J. Striker
ATTORNEY

United States Patent Office 3,486,637
Patented Dec. 30, 1969

3,486,637
LOADING ARRANGEMENT FOR SUPERIMPOSING LAYERS OF OBJECTS
Winfried Hahn, Dortmund-Bracknel, Germany, assignor to Holstein & Kappert Maschinenfabrik Phönix G.m.b.H., Dortmund, Germany
Filed Sept. 4, 1968, Ser. No. 757,408
Claims priority, application Germany, Sept. 5, 1967, 1,270,496
Int. Cl. B65g 37/00
U.S. Cl. 214—6
10 Claims

ABSTRACT OF THE DISCLOSURE

First and second collecting carriages on which layers of objects, such as boxes, are formed by first and second feeding means at first and second collecting stations, are moved between the collecting stations, respectively, and an elevator for depositing on a carrier on the elevator successive superimposed layers of objects, which are stripped off the collecting carriages during movement of the same frame the elevator to a collecting station. The elevator is stepwise lowered for receiving the successive layers of objects, until the carrier on the elevator is fully loaded and is removed by conveyor means when the elevator is at a low transporting level where empty carriers are supplied, and loaded carriers are removed.

Background of the invention

The present invention relates to apparatus for loading objects, such as boxes or crates for bottles, in layers on a series of successive carriers.

Apparatus for this purpose is known which comprises roller conveyor means for transporting a series of successive carriers, sometimes called "pallets" to and from an elevator where the carriers are successively raised from the transporting level to a loading level. At the loading level, two simultaneously operating feeding means, simultaneously feed objects to the carrier until a layer is formed on the same, whereupon the carrier is lowered, and the next level of objects is deposited on the same. In apparatus of this type, the feeding means perform an idle stroke.

Other apparatus according to the prior art provides a single carriage reciprocating between a collecting station where a layer of objects is formed on the carriage, and the elevator where the layer is loaded on the carrier on the same.

Summary of the invention

It is one object of the invention to improve the loading arrangements according to the prior art, and provide a loading arrangement by which the carriers of a successive series of carriers are each loaded by a plurality of layers of objects in a shorter time than required by the apparatus of the prior art.

Another object of the invention is to provide a loading arrangement in which each carrier is provided with alternate layers of objects by two collecting carriages which reciprocate alternately between collecting stations, where they receive a layer of objects, and the elevator by which the carrier is supported.

In accordance with the invention, first and second collecting stations are provided on opposite sides of the elevator between the same and first and second feeding means, and first and second collecting carriages reciprocate in the same directions between the first and second collecting stations and the carrier on the elevator.

During each movement of a collecting carriage to the respective collecting station, a transfer member strips the layer of objects from the respective collecting carriage onto the carrier on the elevator.

Due to this operation, any idle movement of a part of the apparatus is prevented since two collecting and depositing operations cyclically alternate. The superimposing of layers of objects on the carrier on the elevator, takes place without any interruption and in a rapid succession.

One embodiment of the invention comprises an elevator for moving a carrier between a transporting level and a higher loading level, conveyor means for supplying empty carriers 2, and for removing loaded carriers from the elevator at the transporting level, first and second collecting carriages movable at the loading level between the elevator and first and second collecting stations respectively located on opposite sides of the elevator, first and second feeding means for feeding objects in a layer to the first and second collecting carriages at the first and second collecting stations, respectively, and first and second transfer means for transferring a layer of objects from the first or second collecting carriages to the carrier on the elevator while the respective other collecting carriage receives a layer of objects at the respective collecting station from the respective feeding means.

The elevator is moved downward toward the transporting level after alternate transfers of layers of objects from the first and second collecting carriages to the carrier on the elevator. After each downward step of the elevator, another layer of objects is superimposed on the previously deposited layer of objects, and when the carrier is fully loaded, the elevator means moves it down to the transporting level where the conveyor transports the loaded carrier away from the elevator, and places the next following empty carrier on the same for loading at the higher loading level to which the carrier is moved by the elevator.

The transfer means are preferably transfer members which are non-movable in the direction of movement of the collecting carriages so that a layer of objects on each collecting carriage is stripped off the same and deposited on the carrier on the elevator while the respective carriage moves toward the collecting station away from the elevator. It is preferred to provide first and second transfer members for the first and second collecting carriages, and to move the transfer members alternately into the path of movement of the first and second collecting carriages. This construction does not require movement of the transfer members in the horizontal direction of movement of the collecting carriages.

In one embodiment of the invention, first and second feeding conveyors transport rows of objects into regions respectively adjacent the collecting stations so that reciprocating pusher members push each row of objects onto a collecting carriage while the same is at the collecting station so that several rows of objects form a layer on each collecting carriage.

In order to obtain a particular pattern of objects, such as boxes, in the single layer formed on each collecting carriage, a perferred embodiment of the invention provides two feeding conveyors for each collecting station for transporting the objects in transverse directions, and corresponding pusher members push the objects from one and the other feeding conveyor onto the corresponding collecting carriage to form a layer on the same. Such an arrangement with two feeding conveyors for each collecting station, eliminates the necessity of turning the objects, and results in very fast loading operations.

The novel features which are considered as characteristic for the invention are set forth in particular in the appended claims. The invention itself, however, both as to its construction and its method of operation, together with additional objects and advantages thereof, will be

Description of the preferred embodiments

Figure 1:
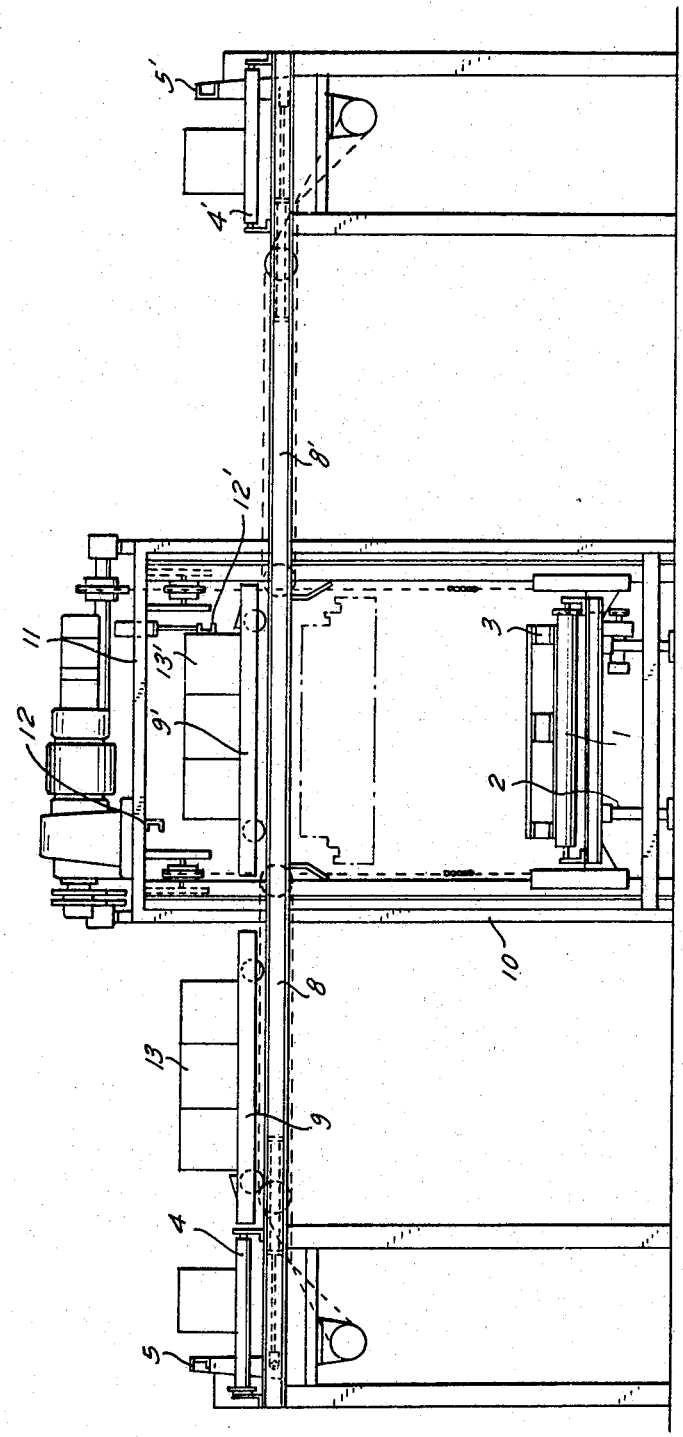
FIG. 1 is a fragmentary schematic elevation illustrating an apparatus according to the invention provided with a singe feeding conveyor for each collecting station.
Figure 2:
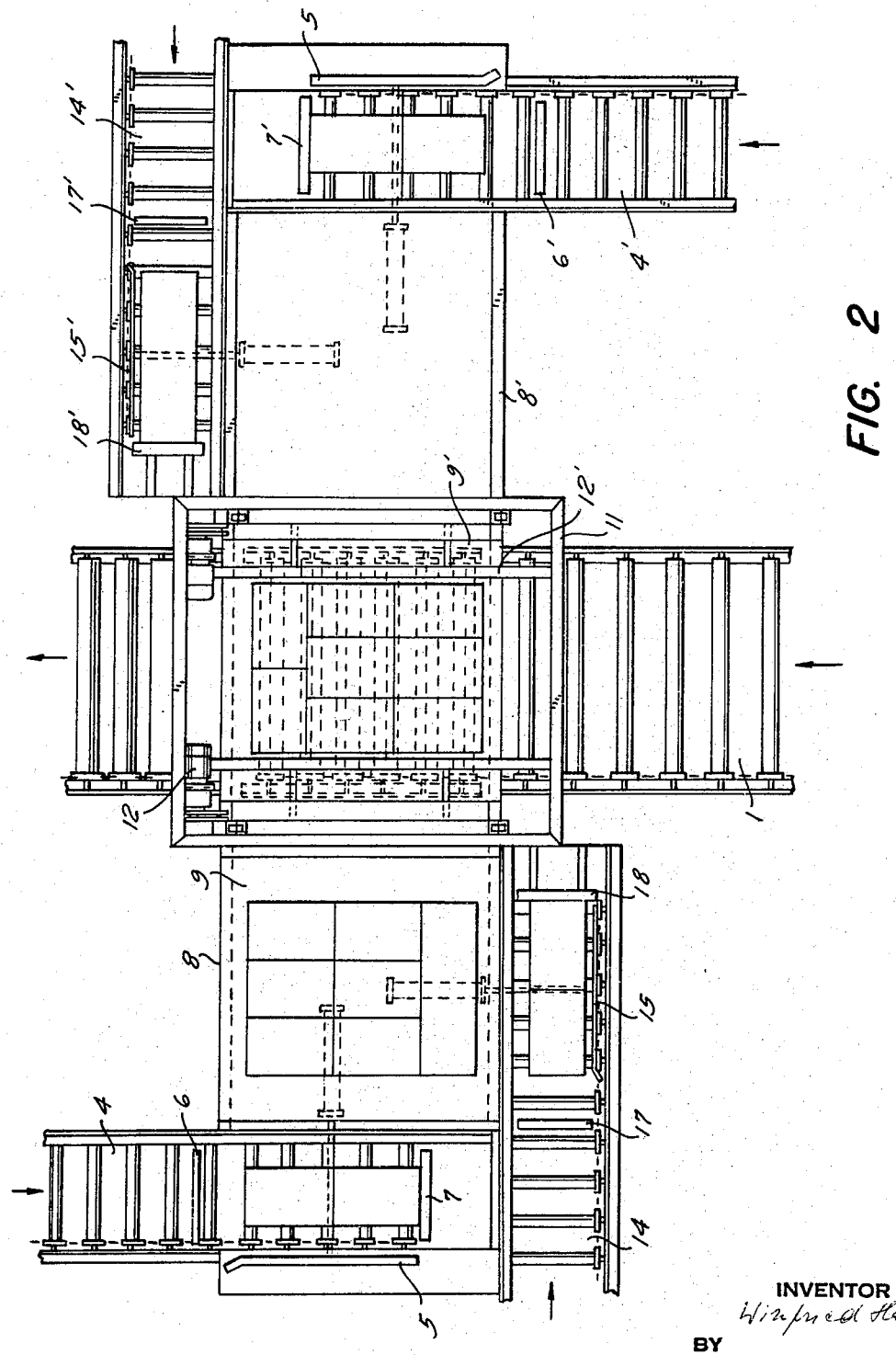
FIG. 2 is a fragmentary schematic plan view of a modified embodiment of the invention in which two feeding conveyors are provided for each collecting station.

The embodiment of FIG. 2 is different from the embodiment of FIG. 1 by providing, in addition to feeding conveyors 4, 4', also feeding conveyors 14 and 14'. Consequently, FIG. 1 may be considered an elevation of the apparatus in FIG. 2 with the second feeding conveyors 14 and 14' omitted, or FIG. 2 may be considered a plan view of FIG. 1, with second feeding conveyors 14 and 14' added.

Referring now to the embodiment of FIG. 1, which will be best understood with reference to the plan view of FIG. 2 when feeding conveyors 14 and 14' are disregarded in the same, the apparatus has a roller conveyor 1 by which successive carriers 3 are transported in empty condition to an elevator 2 where the empty carrier is raised from the low transporting level of conveyor 1 to a higher loading level, and then lowered in loaded condition to the transporting level of conveyor 1 by which the loaded carrier is transported away from the elevator 2. Only one carrier 3 is shown in empty condition in the region of the elevator 2 which is mounted in a supporting structure 10 for up and down movement as indicated by the arrow in FIG. 1.

A supporting frame supports first and second collecting carriages 9 and 9' for movement at the loading level between the position illustrated in FIG. 1 in which collecting carriage 9 is located at a collecting station 8 and collecting carriage 9' is located above the elevator platform 2, and another position in which collecting carriage 9' is located at the collecting station 8', and collecting carriage 9 is located above the elevator platform 2.

The collecting stations 8 and 8' are located on opposite sides of the elevator, and on the sides of the collecting stations 8, 8' remote from the elevator, first and second feeding conveyors 4 and 4' are provided.

Pushing means 5 and 5' are provided on the sides of feeding conveyors 4 and 4' remote from the collecting stations 8 and 8', respectively, and are operable in a direction transverse to the transporting directions of feeding conveyors 4 and 4' to push successive groups of aligned objects such as boxes, from the feeding conveyors 4 and 4' onto the collecting carriages 9 and 9' when the same are located at the respective collecting stations 8 or 8' so that several groups or rows of boxes form a layer 13 on collecting carriage 9, and a layer 13' on collecting carciage 9'.

Stops 6, 6' and 7, 7' are provided for separating groups of boxes forming rows on the feeding conveyors 4 and 4', and are provided in the region of the collecting stations 8, 8' and pusher members 5 and 5'.

On a transverse beam 11 at the upper end of the elevator frame structure 10, transfer members 12 and 12' are mounted for vertical movement into the horizontal path of movement of layers of objects 13, 13' on collecting carriages 9 and 9', respectively.

The loading of a carrier 3 takes place as follows:

The elevator is operated so that the elevator platform 2 raises a carrier 3 to a loading level located directly under the level at which collecting carriages 13 and 13' are supported for reciprocating movement. Collecting carriage 9' is in the position illustrated in FIG. 1 above the elevator platform, and carries a layer of boxes 13'. Transfer member 12' has been lowered to a position located in the path of movement of the layer of boxes 13' on collecting carriage 9' when the same moves toward the collecting station 8' into the proximity of the feeding conveyor 4'.

The collecting carriage 9' is now moved to the collecting station 8', and since transfer member 12' is nonmovable in this direction, the layer 13' is stripped off collecting carriage 9' and is deposited on the carrier 3 which has been raised by the elevator platform 2 to a position located directly below collecting carriage 9' in the illustrated position.

In the meantime, pusher member 5 has been operated to push successive rows of boxes onto collecting carriage 9 at the collecting station 8 to from a layer of boxes 13.

Elevator platform 2 is now lowered one step so that the layer of boxes thereon has a top face located directly below the level at which collecting carriage 9 is now moved to a position located above the elevator platform 2, and directly over the top face of the layer of boxes 13' on carrier 3 on the elevator.

Transfer member 12 is now lowered to a position located at the level of the layer of boxes 13 on collecting carriage 9 so that when the same is moved back to the collecting station 8, transfer member 12 strips the layer 13 off collecting carriage 9 so that the layer 13 is deposited on the layer 13' previously transferred to the carrier 3 on the elevator platform 2.

During this operation, collecting carriage 9' at the collecting station 8' has received three rows of boxes by three strokes of pusher member 5' which pushes successive rows of boxes transported by feeding conveyor 4' into the region of the collecting station 8'. The newly loaded collecting carriage 9' is moved to a position located directly above the two superimposed layers of boxes on carriage 3 on elevator platform 2, after transfer member 12' was withdrawn to an inoperative position.

Before collecting carriage 9' is again moved to the collecting station 8', transfer member 12' is again lowered into the path of movement of the respective layer of boxes, and strips the same from collecting carriage 9' onto the second layer on carrier 3 so that three layers of boxes are superimposed on the same.

By continuing the above-described operations, collecting carriages 9 and 9' alternately receive layers of boxes, and deposit the same on carrier 3 until the desired number of layers has been placed on carrier 3 which is correspondingly lowered. The elevator platform 2 is then further lowered to the transporting level so that the elevator platform 2 deposits the loaded carrier on the conveyor 1 by which the loaded carrier is transported away from the elevator so that an empty carrier 3 can be transported by conveyor means 1 onto the elevator platform 2.

The modified embodiment shown in FIG. 2 is identical with the above-described embodiment of FIG. 1, with the exception that additional feeding conveyors 14 and 14' are added. Feeding conveyors 14 and 14' have stops 17, 17' and 18, 18' respectively and cooperate with pusher means 15 and 15'. Due to the fact that feeding conveyors 4 and 15 are arranged at right angles, rows of boxes pushed by pusher means 5 onto collecting carriage 9 are transverse to a row of boxes pushed by pusher member 15 onto collecting carriage 9, and a different pattern of boxes on the collecting carriage 9 can be obtained, and the formation of a layer of boxes on the same requires less time than in the event that only one feeding conveyor is provided. The feeding of boxes by conveyors 4' and 14' onto a collecting carriage 9' located at the collecting station 8' is carried out in the same manner.

Conventional drive means are provided for driving the conveyors 1, 4, 4', 14, 14', for reciprocating pusher means 5, 5', 15, 15', for reciprocating collecting carriages 9, 9', raising the elevator platform 2 with carrier 3 to the loading level, lowering the elevator platform in steps corresponding to the height of the loaded layers of boxes to the transporting level, and for raising and lowering the transfer members 12, 12', in the above-described timed relation. Since drive means of this type are well known to those skilled in the art, and can be constructed by a mechanic, they have not been illustrated in the drawing.

It will be understood that each of the elements described above, or two or more together, may also find a useful application in other types of loading arrangements for boxes differing from the types described above.

While the invention has been illustrated and described as embodied in a loading arrangement for placing superimposed layers of boxes on a carrier, it is not intended to be limited to the details shown, since various modifications and structural changes may be made without departing in any way from the spirit of the present invention.

What is claimed as new and desired to be protected by Letters Patent is set forth in the appended claims.

1. Loading arrangement for superimposing layers of objects, comprising, in combination, elevator means movable between a transporting level and a loading level; carrier means movable by said elevator means between said levels; conveyor means for supplying empty carrier means to, and for removing loaded carrier means from said elevator means at said transporting level; first and second collecting carriages; supporting means supporting said first and second collecting carriages for movement at said loading level between said elevator means and first and second collecting stations, respectively, located on opposite sides of said elevator means; first and second feeding means for feeding objects in a layer to said first and second collecting carriages at said first and second collecting stations, respectively; and first and second transfer means for transferring a layer of objects from one of said first and second collecting carriages, respectively, to said carrier means on said elevator means while the respective other collecting carriage receives a layer of objects at the respective collecting station from the respective feeding means, said elevator means being moved toward said transporting level after alternate transfers of layers of objects from said first and second collecting carriages to said carrier means on said elevator means so that superimposed layers of objects are loaded on said carrier means whereupon the same are removed by said conveyor means from said elevator means.

2. Loading arrangement as claimed in claim 1 wherein said supporting means support said first and second collecting carriages at a loading level which is higher than said transporting level; and wherein said elevator means stepwise moves downward toward said transporting level after each transfer of a layer of objects to said carrier means on said elevator means.

3. Loading arrangement as claimed in claim 1 wherein said first and second collecting carriages move along a path; and wherein said transfer means are non-movable along said path and movable into said path for engaging the layers of objects on said collecting carriages, respectively, during movement of the same away from said elevator means toward the respective collecting station so that the respective layer is deposited on said carrier means on said elevator means.

4. Loading arrangement as claimed in claim 3 wherein said transfer means include first and second transfer members respectively cooperating with said first and second collecting carriages and alternately moving to said loading level for alternately engaging layers of objects on said first and second collecting carriage means.

5. Loading arrangement as claimed in claim 1 wherein said first and second feeding means include first and second feeling conveyor means for feeding objects to first and second regions respectively adjacent said first and second collecting stations, and first and second pusher means in said first and second regions for moving said objects onto said first and seconl collecting carriages, respectively, at said first and second collecting stations.

6. Loading arrangement as claimed in claim 1, wherein said first feeding means include two first feeding conveyors moving transversely to each other, and said second feeding means include two second feeding conveyors moving transversely to each other, said first feeding conveyors and said second feeding conveyors feeding objects to first and second regions respectively adjacent said first and second collecting stations, said feeling means further including two first and two second pusher means in said first and second regions, said two first pusher means and said two second pusher means, respectively, being operable for moving objects from said two first conveyors and from said two second conveyors onto said first and second collecting carriages, respectively, at said first and second collecting stations.

7. Loading arrangement as claimed in claim 6 wherein each of said first and second pusher means is reciprocable; wherein said two first feeding conveyors are located on sides of said first collecting station remote from said elevator means; and wherein said two second feeding conveyors are located in front and in the rear of said elevator means and adjacent said first and second collecting stations, respectively; and wherein each first feeding conveyor moves at right angles to the direction of movement of the respective second feeding conveyor adjacent the same collecting station.

8. Loading arrangement as claimed in claim 1 wherein said supporting means support said first and second collecting carriages at a loading level which is higher than said transporting level; wherein said elevator means stepwise moves downward toward said transporting level after each transfer of a layer of objects to said carrier means on said elevator means; wherein said first and second collecting carriages reciprocate along a straight path; and wherein said transfer means include first and second transfer members non-movable along said path and being alternately movable into said path to said loading level for alternately engaging layers of objects on said first and second collecting carriage means, respectively, during movement of the same away from said elevator means toward the respective collecting station so that the respectively engaged layer is deposited on said carrier means on said elevator means.

9. Loading arrangement as claimed in claim 8 wherein said first and second feeding means include first and second feeling conveyor means for feeding objects to first and second regions respectively adjacent said first and second collecting stations, and first and second pusher means in said first and second regions for moving said objects onto said first and second collecting carriages, respectively, at said first and second collecting stations.

10. Loading arrangement as claimed in claim 8 wherein said first feeding means include two first feeding conveyors moving transversely to each other, and two second feeding conveyors moving transversely to each other, said first feeding conveyors and said second feeding conveyors feeding objects to first and second regions respectively adjacent said first and second collecting stations, said feeding means further including two first and two second pusher means in said first and second regions, said two first pusher means and said two second pusher means, respectively, being operable for moving objects from said two first conveyors and from said two second conveyors onto said first and second collecting carriages, respectively, at said first and second collecting stations.

References Cited

UNITED STATES PATENTS 2,883,074  4/1959  Boehl et al.
3,404,788  10/1968  Thomas et al.

GERALD M. FORLENZA, Primary Examiner

ROBERT J. SPAR, Assistant Examiner